Patented Aug. 26, 1952

2,608,550

UNITED STATES PATENT OFFICE 2,608,550

REACTION PRODUCTS OF UNSATURATED DICARBOXYLIC ACID DERIVATIVES WITH CYCLOPENTADIENE POLYMERS

Charles S. Rowland, Larchmont, and Albert G. Chenicek, Hartsdale, N. Y., assignors to Interchemical Corporation, New York, N. Y., a corporation of Ohio No Drawing. Application January 8, 1947, Serial No. 720,932

9 Claims. (Cl. 260—78.5)

This invention relates to synthetic resins and particularly to such resins derived from the relatively low molecular weight heat polymers of the five-carbon cyclic conjugated diolefins obtainable from the cracking of hydrocarbon materials such as light oil, natural gas and petroleum, by the copolymerization of such polymers with alpha, beta, unsaturated dicarboxylic acids.

Cyclopentadiene, one of the major constituents of the five-carbon olefin and diolefin fraction from the cracking of hydrocarbon material, can be polymerized by heat or it can be catalytically polymerized. In the catalytic polymerization of cyclopentadiene, the polymeric product usually obtained is a high molecular weight thermosetting resin generally believed to have a linear structure. Catalysts employed in such polymerizations include acid-acting catalysts such as aluminum chloride, ferric chloride, and boron trifluoride. Heat polymers of cyclopentadiene are formed by heating the monomer at atmospheric pressure or preferably under superatmospheric pressure. These heat polymers consist of a mixture of unsaturated low molecular weight polymers containing for the most part dimers, trimers, tetramers, pentamers and hexamers of cyclopentadiene. Heat polymers which are copolymers of cyclopentadiene and one or more olefins and other diolefins are formed when mixtures of cyclopentadiene with olefins and other diolefins are heated. By heat alone, however, it has not been possible to obtain a high molecular weight cyclopentadiene polymer or copolymer.

In the preparation of the novel resins contemplated by this invention the preferred source material is dicyclopentadiene, tricyclopentadiene, or other relatively low molecular weight heat polymers of cyclopentadiene, or mixtures of these, or mixtures of any one or more of these heat polymers with codimers, cotrimers, etc., formed by heat polymerization of mixtures of cyclopentadiene with olefins and other diolefins.

Although there may be used any of the starting materials stated hereinabove it is preferred to use as the starting material a mixture of heat polymers obtained by heat polymerization of mixtures of cyclopentadiene with olefins and other diolefins, chiefly those containing five carbon atoms per molecule, such as pentenes, piperylene, and isoprene. It should be understood, however, that the use of such starting material is preferred merely because it is readily and economically available from commercial processes for cracking hydrocarbons such as light oil, natural gas and petroleum.

In the cracking of hydrocarbon substances such as natural gas, light oil and petroleum, a complex mixture consisting largely of olefins, diolefins and aromatics is obtained. By fractional distillation of this mixture, a fraction consisting for the most part of five-carbon olefins and diolefins such as pentenes, isoprene, piperylene, and cyclopentadiene, and minor amounts of the four and six-carbon olefins and diolefins can be obtained. Commercially, cyclopentadiene, which is a valuable polymerization monomer, can be separated from this mixture of $C_5$ olefins and diolefins by heating the mixture under such conditions of heat and pressure as to convert substantially all of the cyclopentadiene to polymeric form, chiefly dicyclopentadiene, without appreciably affecting the other unsaturated constituents thereof. Distillation of the lower boiling components of this partially polymerized mixture then gives a residue consisting largely of dicyclopentadiene and minor amounts of the dimers and codimers of other unsaturates in the original mixture together with minor amounts of higher polymers and copolymers of both cyclopentadiene and other unsaturates. Continued heating of this dicyclopentadiene concentrate at reflux, which temperature of course will be approximately the boiling point of dicyclopentadiene, results in depolymerization of substantially all of the dicyclopentadiene and distillation of the cyclopentadiene formed without appreciably effecting depolymerization of other dimers and codimers in the mixture. In fact some further heat polymerization of the other unsaturates in the mixture may occur during this depolymerization and distillation of the cyclopentadiene so as to give a still bottoms, after a major portion of the cyclopentadiene has been removed, which consists of low molecular weight heat polymers and copolymers of cyclopentadiene, isoprene, piperylene, and pentenes.

The bottoms referred to hereinabove as a by-product in the production of cyclopentadiene has, in the past, received little attention in the resin industry and has been considered largely as waste. The nature of this still bottoms may vary considerably depending upon the process used to remove various constituents from it. In one commercial process from which such still bottoms can be obtained a mixture of the $C_5$ olefins and diolefins obtained in the cracking of hydrocarbon material is heat-dimerized, and the resulting product is concentrated by distillation of the more volatile undimerized constituents to a mixture containing about 70 per cent dicyclopentadiene and 30 per cent dimers, codimers and higher heat polymers and copolymers of pentenes, isoprene and piperylene and codimers and other heat polymers and copolymers of these substances with cyclopentadiene. Such a concentrate is commercially available as a source of cyclopentadiene or dicyclopentadiene. The still bottoms referred to hereinabove is derived by heating this 70 per cent concentrate approximately to the reflux temperature of dicyclopentadiene whereby depolymerization of a large portion of the dicyclopentadiene and distillation of cyclopentadiene from the concentrate are effected. The resulting still bottoms may then be used as a starting material for the preparation of the new thermoplastic resin of my invention. Obviously, the composition of the still botoms will vary depending upon the efficiency of separating cyclopentadiene from the concentrate.

It should be pointed out, however, that this bottoms may be used no matter what the efficiency of removal of cyclopentadiene is. In fact the 70 per cent concentrate may be used without removing any of the cyclopentadiene. In general it has not been practical to remove all of the cyclopentadiene from such a concentrate, hence, the still bottoms which remains will always contain some cyclopentadiene heat polymers either in the form of dimers, trimers, etc., of cyclopentadiene itself or of copolymers of cyclopentadiene with olefins and other diolefins in the mixture. Due to the inherent complexity of such a mixture it is difficult to establish a definite lower limit of cyclopentadiene heat polymer concentration in this bottoms which will give a mixture suitable for carrying out the invention.

In summary it may be stated that dicyclopentadiene is to be considered the prototype starting material. However, a pure starting material is not necessary and is not commercially attractive. As a consequence, the starting material will include the higher heat polymers of cyclopentadiene and the copolymers of cyclopentadiene with other conjugated diolefins of the same general boiling range. Obviously, the simple substitution products of the starting materials may also be used. It is preferred to describe this raw material as: crude heat polymers of cyclopentadiene, $C_5$ and substituted $C_5$ conjugated diolefins wherein a major portion of the $C_5$ hydrocarbons are cyclic.

Since reference to this definition is unwieldy, it is to be understood in the remainder of the description that where reference is made to the crude form of the prototype dicyclopentadiene, the description is applicable to the crude source material above defined.

It is known that conjugated diolefins such as butadiene and cyclopentadiene react according to the Diels-Alder reaction with alpha, beta unsaturated dicarboxylic acid to yield comparatively simple acidic addition products. Thus butadiene yields the anhydride of 1,2,3,6-tetrahydrophthalic acid with maleic anhydride; also cyclopentadiene and maleic anhydride yield 3,6 endomethylene 1,2,3,6-tetrahydrophthalic anhydride.

It is also known that the conjugated and non-conjugated terpenes react with these acids to give a variety of products depending on the reaction conditions and the presence or absence of modifying agents.

It has now been found that crude as well as refined heat polymers of cyclopentadiene react with alpha, beta-unsaturated dicarboxylic acids or their anhydrides, nitriles, esters or substances capable of forming such compounds under the conditions involved even though the polymer is not conjugated, and the products of reaction are relatively complex, resinous compounds.

The unsaturated dicarboxylic acids or anhydrides include not only maleic acid and anhydride but also substitution products thereof where the hydrogens of the ethylene group, either one or both, are replaced by such groups as alkyl, aryl, aralkyl, halogen, sulfonic acid and so forth and also such carboxylic acid derivatives as nitriles, esters and amides. Substances capable of acting as or being converted into maleic acids include fumaric, citraconic, itaconic, aconitic, oxalocitraconic, mesaconic, malic, beta-acrylacrylic, 1,4-dihydronaphthalene 2, 3 dicarboxylic, phenylmaleic and t-butlymaleic acids.

When approximately equi-molecular ratios or ratios including a slight excess up to 30% of olefin are employed, resins of relatively light color, melting points from 30° C. to 125° C. and acid numbers from 280 to 500 are obtained.

The reaction may be modified by the presence of other materials that react with alpha, beta-unsaturated acids such as indene, cumarone, dipentene, alpha-pinene, abietic acid, rosin, alpha-phellandrene, styrene, alpha-terpinene and ocimene.

It has been found that the reaction conditions may be varied between 125° C. and 250° C., the preferred range being 140° C. to 200° C. The rate of reaction below 125° C. is so low that temperatures below this figure may be neglected. The time of reaction is of course generally dependent upon the temperature employed. It has been observed that the major portion of the reaction takes place quite rapidly, that is, within an hour or so, but it tends to slow up before completion so that several additional hours are necessary to completely carry out the reaction.

The reaction proceeds readily without the assistance of a catalyst. A catalyst may be used if desired in amounts of from 0.1 to 5% and the use of such catalyst normally results in the production of a somewhat harder product. Either a peroxide type may be used such as benzoyl peroxide, t-butyl perbenzoate, and the like or an acid-acting catalyst such as sulfuric acid, zinc chloride or p-toluenesulfonic acid or the like may be used.

It has been found that the reaction may be carried on under super-atmospheric pressure but a satisfactory rate of reaction can be obtained by the use of reflux conditions in the presence of heat and such conditions are generally preferred. The reaction may also be carried out in solvent solution. For best results the boiling point of the solvent should be in the range of optimum reaction conditions. Examples of such solvents are xylene and methyl amyl ketone.

It is preferred to employ equi-molecular quantities of the reacting ingredients or a slight excess of the olefin. Up to 30% additional may be employed and any unreacted materials may be removed following completion of the reaction.

Purification of the product when required, may be carried out in various manners; for example, vacuum distillation or using a stream of inert gas at elevated temperatures are generally preferred. However, solvent purification is also satisfactory either by dissolving the total product in a solvent and precipitating the desirable resinous material by means of a non-solvent or by extracting with a liquid which dissolves the impurities, but does not dissolve the resinous product.

The resinous products obtained as disclosed herein are useful in a wide variety of applications. They may be used directly with other resinous materials and in this respect they are characterized by extensive compatibility. They may be used with cellulose acetate, nitrocellulose, polyvinyl acetate, polyvinyl chloracetate, polyvinylbutyral or polyvinylacetal.

Because the resinous materials are characterized by a high acid number, they may be reacted in a manner chaarcteristic of dibasic acids to form esters with alcohols, glycols, glycerol and pentaerythritols. They may be used to produce alkyd resins, either plain or modified with rosin, fatty acids and fatty acid glycerides. They may be reacted with various metals and ammonia to produce salts having extensive utility. They may also be used to modify phenolformaldehyde resins. Examples of resins made in accordance with the foregoing disclosure follow:

*Example I.—Pure dicyclopentadiene with maleic anhydride*

One hundred and thirty-two parts of dicyclopentadiene (M. P. 32–33° C.) and 98 parts of maleic anhydride are placed in a vessel equipped with a reflux condenser, thermometer and stirrer. The reactants are heated to 150–160° C., and held for two hours. The temperature is then gradually raised to 200° C. over a period of about four to six hours. The mixture is heated in vacuo to 175–250° C. at 15–50 mm. pressure, whereby any unreacted dicyclopentadiene or maleic anhydride are removed. The yield of clear, pale yellow, soft amorphous solid amounts to 207 parts. The product analyzed 72.21% carbon, 6.10% hydrogen, and 21.69% oxygen (by difference), and had an acid value of 476.

The following example illustrates the utilization of a commercial grade of dicyclopentadiene obtained as described previously. Analysis of one source material showed a dicyclopentadiene content of about 70%, along with other heat polymers and copolymers of conjugated diolefins as methyl cyclopentadiene, isoprene, piperylene, butadiene, etc. It has been found that the latter described products react as does the pure dicyclopentadiene.

*Example II.—70% dicyclopentadiene with maleic anhydride*

Ninety-six and three-quarter pounds of 70% dicyclopentadiene containing other conjugated diolefin heat polymers and copolymers as described previously and 63¼ lbs. of maleic anhydride are heated under reflux and constant stirring to 160° C. After a slight exothermic reaction subsides, the temperature is gradually raised to 190–200° C. over a period of five to seven hours; after which time the slight excess of hydrocarbon is distilled in vacuo (20–40 mm.) at a reaction temperature of 180–200° C. There is recovered 149 pounds of pale amber, resinous product of softening point 36.5° C., and acid value 470–480. This amount represents a 93.2% yield based on total reactants or a 100% reaction of the maleic anhydride. The acidic resin is soluble in acetone, ethyl acetate, and toluene.

The copolymerization may be effected in the presence of a molar excess of heat polymers of the conjugated diolefins. Below is cited an example wherein approximately 1.2 moles of crude dicyclopentadiene is used per mole of maleic anhydride.

*Example III.—70% dicyclopentadiene with maleic anhydride using a mole ratio of 1.2 to 1*

One hundred and fifty-nine parts of 70% dicyclopentadiene and ninety-eight parts of maleic anhydride are heated to 160° C. During a period of three hours the temperature is raised to 200° C. Heating is continued for seven hours at 215–240° C., followed by removal of unreacted hydrocarbon in vacuo. A soft solid of acid value 455 is obtained in the amount of 227 parts. The yield based on the maleic anhydride is 98.5%.

By the polymerization of cyclopentadiene under heat and pressure there is obtained varying quantities of the numerous possible heat polymers, for example, dicyclopentadiene, tricyclopentadiene, tetracyclopentadiene, etc. By fractionation, it is possible to separate the individual products. An example of the copolymerization of tricyclopentadiene with maleic anhydride is shown.

*Example IV.—Tricyclopentadiene with maleic anhydride*

Three hundred and eleven parts of tricyclopentadiene (B. P. 136–138° C. at 11.5 mm.) and 147 parts of maleic anhydride was heated rapidly under reflux with constant stirring to 160° C. The temperature was then gradually raised to 230° C. over a period of six to seven hours after which time the unreactants were removed in vacuo at 250° C. and 13 mm. pressure. The yield was 421 parts or 95% based on the maleic anhydride. The brittle, tack-free product had a M. P. of 103–117° C. and an acid value of 345.

Other alpha, beta unsaturated dicarboxylic acids or anhydrides react similarly to that of maleic anhydride. An example of such an acid is fumaric acid.

*Example V.—70% dicyclopentadiene with fumaric acid*

Sixteen hundred parts of 70% dicyclopentadiene and thirteen hundred and thirty-three parts of fumaric acid were heated under reflux with stirring to 160–170° C. where the mixture was held for four hours. The temperature was raised gradually to 200° C. over a period of three to four hours. Removal of unreactants was accomplished by heating in vacuo at 20–40 mm. and 200° C. A brittle tack-free solid weighing 2753 parts was recovered, amounting to 96.5% based on the maleic anhydride. The resinous acid had a M. P. of 88–97° C., and was soluble in acetone, ethanol, diethylene glycol, toluene, ethyl acetate, and aqueous alkali. It exhibited compatibility with ethyl cellulose, nitrocellulose, cellulose acetate, and vinylite resins. The product analyzed 67.32% carbon, 6.43% hydrogen, and 26.25% oxygen (by difference), and had an acid value of 450.

A catalyst may be employed in carrying out the reaction described. Both peroxide type and acid or acid-acting catalytic materials may be used. Typical of the former class are benzoyl peroxide, tertiary butyl hydroperoxide, t-butyl perbenzoate, ditertiarybutyl diperphthalate, etc., while examples of the latter include p-toluenesulfonic acid, sulfuric acid, zinc chloride, etc. The use of a catalyst, preferably in the amount of 0.1–5%, normally results in the production of a harder product.

*Example VI.—Copolymerization using a peroxide catalyst*

To 344 parts of 70% grade dicyclopentadiene and 245 parts of maleic anhydride is added 2.95 parts of tertiary butyl hydroperoxide, 0.5% based on the total reactants. The mixture is heated at 130–135° C. for one hour, followed by refluxing for four to five hours at 165–175° C. Carbon dioxide gas is introduced and the temperature raised to approximately 200° C. over a period of three hours. A brittle, amber product weighing 544 parts is recovered. It has a softening point of 100° C., and acid value of 462, and is soluble in acetone.

*Example VII.—Copolymerization using an acid catalyst*

To 344 parts dicyclopentadiene and 245 parts of maleic anhydride is added 2.95 parts para-toluene-sulfonic acid. The mixture is heated at 135–140° C. for one hour, followed by a gradual rise in temperature to 210° C. over a period of four hours. Any unreactants are then removed by heating in vacuo at 230° C. and 15–30 mm. for one hour. The product will be about 575 parts of a hard brittle resin of softening point 105–110° C. and acid value 468.

The above type products can be further modified by copolymerization with a third component such as indene, coumarone, dipentene and alpha-pinene.

*Example VIII.—Indene modified maleic anhydride-dicyclopentadiene reaction product*

One hundred and thirty-six parts of 70% grade dicyclopentadiene, 119.1 parts of indene, and 196.2 parts of maleic anhydride are heated at 90–100° C. for one hour. The temperature is raised to about 190° C. over a period of four hours, followed by removal of any unreactants in vacuo. There is recovered 446 parts of an amber brittle resin. The M. P. and acid value are 94–110° C. and approximately 434, respectively. The product is soluble in acetone and ethyl acetate.

The diene type reaction of unsaturated acids, as maleic, with abietic acid is well known. It is thus possible to further modify the dicyclopentadiene-unsaturated acid copolymer by the incorporation of rosin. With maelic anhydride and dicyclopentadiene, the use of rosin makes possible the formation of a solid product in contrast to the usual soft resin, thus affording a more desirable material for handling purposes.

*Example IX.—Rosin modified dicyclopentadiene-fumaric acid reaction product*

Two hundred and seventy-eight parts of dicyclopentadiene, 90.7 parts of grade N wood rosin, and 267 parts of fumaric acid are heated and stirred for one hour under reflux at 150–160° C. The temperature is raised to 200° C. over a period of three hours, the reflux condenser removed and a final heating at 215–225° C. for about four hours.

A brittle amber resin of M. P. 102–117° C. and acid value of approximately 435 is obtained in about 95% yield. The product is soluble in diethylene glycol and acetone. The "still bottoms" derived from the cracking of commercial grade dicyclopentadiene containing 30–90% dicyclopentadiene offers another source of olefinic constituents of the nature disclosed herein. The "still bottoms" consists largely of heat polymers and copolymers of $C_5$ conjugated diolefins as cyclopentadiene, isoprene, and piperylene with minor quantities of methyl cyclopentadiene present.

*Example X.—"Still bottoms"—maleic anhydride reaction product*

In a one-liter flask fitted with stirrer, condenser and thermometer are placed 331 parts of still bottoms (typical sample—B. P. 62–145° C. at 13–14 mm., $n_D^{25}$ 1.5157, sp. gr.—0.976 at 25° C.) and 239 parts of maleic anhydride. The mixture is heated to 160° C., then the temperature is gradually raised to about 210° C. over a period of three to four hours. Any unreacted material is removed in vacuo at 215° C. and 11 mm. pressure. There is obtained 548 parts of an amber resin of M. P. 76–85° C. and acid value about 440.

*Example XI.—70% dicyclopentadiene with chloro-maleic anhydride*

One hundred and thirty-two parts of commercial 70% dicyclopentadiene and 132 parts of chloro-maleic anhydride are heated for three and one-half hours at 190 to 215° C. Any unreactants are removed by heating in vacuo at 230° C. and 15 mm., and there is recovered a brown brittle resin in 91% yield. It has a softening pt. of approximately 65° C.

*Example XII.—70% dicyclopentadiene with itaconic acid*

Following the procedure used in Example VI, a soft solid resin, amber in color, is prepared from 132.2 parts commercial 70% dicyclopentadiene and 130.1 parts itaconic acid (methylene succinic acid) to which is added 1.3 parts of tertiary-butyl hydroperoxide catalyst. The product has an acid value of 392, and is soluble in acetone, ethyl acetate, and toluene.

*Example XIII.—70% dicyclopentadiene with di-(2-ethylbutyl) maleate*

Dicyclopentadiene (70% grade), 139 parts, and 285 g. of di-(2-ethylbutyl) maleate were heated under reflux and with constant agitation to 180–190° C. at which temperature reflux began. Over a period of about five hours the temperature was raised to approximately 225° C. after which time no reflux was evident. Removal of unreacted materials was effected by heating in vacuo at 225° C. and 12 mm., and a light amber colored liquid was recovered in 92% yield. The product was bodied to a very viscous liquid by heating with peroxides or converted to a solid resin by treatment with acid type catalysts, such as boron trifluoride.

Other modifications will be apparent to the skilled chemist.

We claim:

1. Resinous products comprising the reaction of a compound of the class consisting of alpha, beta-ethylenically unsaturated dicarboxylic acids, alpha, beta-ethylenically unsaturated dicarboxylic acid anhydrides, alpha, beta-ethylenically unsaturated dicarboxylic acid esters, and alpha, beta-ethylenically unsaturated dicarboxylic acid nitriles, with from 1 to 1.3 molecular equivalents of a material selected from the class consisting of (1) a low molecular weight heat-polymerized homopolymer of cyclopentadiene, (2) mixtures of low molecular weight heat-polymerized homopolymers of cyclopentadiene, and (3) low molecular weight heat-polymerized copolymers of crude fractions obtained from the cracking of hydrocarbon materials and which consists of $C_5$ and substituted C₅ conjugated diolefins in which the major portion of said conjugated diolefins are cyclic, said heat polymers and copolymers having been prepared in the absence of added catalyst, the resin-forming reaction being carried out by heating the reactants up to a temperature of 160° C. for a period of one to several hours, followed by increased heating up to 250° C. for a further period up to several hours.

2. Resinous products of the reaction of a compound of the class consisting of alpha, beta-ethylenically unsaturated dicarboxylic acids, alpha, beta-ethylenically unsaturated dicarboxylic acid anhydrides, alpha, beta-ethylenically unsaturated dicarboxylic acid amides, alpha, beta-ethylenically unsaturated dicarboxylic acid esters, and alpha, beta-ethylenically unsaturated dicarboxylic acid nitriles, with from 1 to 1.3 molecular equivalents of a material selected from the class consisting of (1) a low molecular weight heat-polymerized homopolymer of cyclopentadiene, (2) mixtures of low molecular weight heat-polymerized homopolymers of cyclopentadiene, and (3) low molecular weight heat-polymerized copolymers of crude fractions obtained from the cracking of hydrocarbon materials and which consists of C₅ and substituted C₅ conjugated diolefins in which the major portion of said conjugated diolefins are cyclic, said heat polymers and copolymers having been prepared in the absence of added catalyst, and further modified by reaction with an unsaturated resin-forming compound capable of reacting with the unsaturated acids under the conditions of the reaction, the resin-forming reaction being carried out by heating the reactants up to a temperature of 160° C. for a period of one to several hours, followed by increasing heating up to 250° C. for a further period up to several hours.

3. Resinous reaction products of the reaction of a compound of the class consisting of alpha, beta-ethylenically unsaturated dicarboxylic acids, alpha, beta-ethylenically unsaturated dicarboxylic acid anhydrides, alpha, beta-ethylenically unsaturated dicarboxylic acid amides, alpha, beta-ethylenically unsaturated dicarboxylic acid esters, and alpha, beta-ethylenically unsaturated dicarboxylic acid nitriles, with from 1 to 1.3 molecular equivalents of a low molecular weight heat-polymerized homopolymer of cyclopentadiene, said heat polymer having been prepared in the absence of added catalyst, the resin-forming reaction being carried out by heating the reactants up to a temperature of 160° C. for a period of one to several hours, followed by increased heating up to 250° C. for a further period up to several hours.

4. Resinous reaction products of fumaric acid and 1 to 1.3 molecular equivalents of a low molecular weight heat-polymerized homopolymer of cyclopentadiene, said heat polymer having been prepared in the absence of added catalyst, the resin-forming reaction being carried out by heating the reactants up to a temperature of 160° C. for a period of one to several hours, followed by increased heating up to 250° C. for a further period up to several hours.

5. The method which comprises copolymerizing a compound of the class consisting of alpha, beta-ethylenically unsaturated dicarboxylic acids, alpha, beta-ethylenically unsaturated dicarboxylic acid anhydrides, alpha, beta-ethylenically unsaturated dicarboxylic acid amides, alpha, beta-ethylenically unsaturated dicarboxylic acid esters, and alpha, beta-ethylenically unsaturated dicarboxylic acid nitriles, with from 1 to 1.3 molecular equivalents of a material selected from the class consisting of (1) a low molecular weight heat-polymerized homopolymer of cyclopentadiene, (2) mixtures of low molecular weight heat-polymerized homopolymers of cyclopentadiene, and (3) low molecular weight heat-polymerized copolymers of crude fractions obtained from the cracking of hydrocarbon materials and which consist of C₅ and substituted C₅ conjugated diolefins in which the major portion of said conjugated diolefins are cyclic, said heat polymers and copolymers having been prepared in the absence of added catalyst, the copolymerization being carried out by heating the reactants up to a temperature of 160° C. for a period of one to several hours, followed by increased heating up to 250° C. for a further period up to several hours.

6. The method of claim 5 wherein there is also present for copolymerization another unsaturated resin-forming compound capable of reacting with the alpha, beta-ethylenically unsaturated compound.

7. The method of claim 5 wherein unreacted constituents are removed from the reaction mass by distillation under reduced pressure.

8. The method of claim 5 wherein unreacted constituents are removed from the reaction mass by solvent extraction.

9. The method of claim 5 wherein the copolymerization is carried out with the assistance of a peroxide catalyst.

CHARLES S. ROWLAND.
ALBERT G. CHENICEK.

REFERENCES CITED

The following references are of record in the file of this patent:

UNITED STATES PATENTS

| Number | Name | Date |
| --- | --- | --- |
| 2,092,295 | Van Peski | Sept. 7, 1937 |
| 2,142,980 | Huijser | Jan. 3, 1939 |
| 2,423,234 | Gerhart et al. | July 1, 1947 |

FOREIGN PATENTS

| Number | Country | Date |
| --- | --- | --- |
| 578,867 | Great Britain | July 15, 1946 |